US 9,357,265 B2

(12) United States Patent
Wang et al.

(10) Patent No.: US 9,357,265 B2
(45) Date of Patent: May 31, 2016

(54) SYSTEM AND METHOD FOR CREATING AND MANAGING INDIVIDUAL USERS FOR PERSONALIZED TELEVISION ON BEHALF OF PRE-EXISTING VIDEO DELIVERY PLATFORMS

(71) Applicant: UXP Systems Inc., Toronto (CA)

(72) Inventors: Jerry Wang, Markham (CA); Soyeon Lim, Toronto (CA); Gemini Waghmare, Toronto (CA); Jay A. Deen, Toronto (CA)

(73) Assignee: UXP Systems Inc., Toronto (CA)

( * ) Notice: Subject to any disclaimer, the term of this patent is extended or adjusted under 35 U.S.C. 154(b) by 30 days.

(21) Appl. No.: 14/225,014

(22) Filed: Mar. 25, 2014

(65) Prior Publication Data

US 2015/0281782 A1  Oct. 1, 2015

(51) Int. Cl.
| | |
|---|---|
| *H04N 21/466* | (2011.01) |
| *H04N 21/442* | (2011.01) |
| *H04N 7/173* | (2011.01) |
| *H04N 21/258* | (2011.01) |
| *H04N 21/23* | (2011.01) |
| *H04N 21/20* | (2011.01) |
| *H04N 21/80* | (2011.01) |
| *H04N 21/222* | (2011.01) |
| *H04N 21/81* | (2011.01) |
| *H04N 21/234* | (2011.01) |

(52) U.S. Cl.
CPC .......... *H04N 21/4667* (2013.01); *H04N 7/173* (2013.01); *H04N 21/20* (2013.01); *H04N 21/222* (2013.01); *H04N 21/23* (2013.01); *H04N 21/23424* (2013.01); *H04N 21/25891* (2013.01); *H04N 21/44209* (2013.01); *H04N 21/44213* (2013.01); *H04N 21/44245* (2013.01); *H04N 21/80* (2013.01); *H04N 21/812* (2013.01); *H04N 21/8126* (2013.01); *H04N 21/8133* (2013.01)

(58) Field of Classification Search
None
See application file for complete search history.

(56) References Cited

U.S. PATENT DOCUMENTS

| 2008/0282305 A1* | 11/2008 | Uhrig | G06Q 20/10 725/114 |
|---|---|---|---|
| 2012/0144423 A1* | 6/2012 | Kim | H04N 21/47 725/39 |
| 2013/0014147 A1* | 1/2013 | Hadfield | H04N 21/43 725/14 |
| 2013/0145388 A1* | 6/2013 | Girouard | G06Q 30/0241 725/14 |
| 2013/0198767 A1* | 8/2013 | Wang | H04L 65/80 725/14 |

OTHER PUBLICATIONS

Lawler, Richard; Cox Cable launches personalized Contour experience with iPad app, 2TB tuner DVR; Aug. 7, 2013; retrieved Mar. 6, 2014 from http://www.engadget.com/2013/08/07/cos-cable-contour-6-tuner-dvr-ipad/.

Perez, Sarah; "Netflix User Profiles Start Appearing on Apple TV"; Jul. 30, 2013; retrieved Mar. 6, 2014 from http://techcrunch.com/2013/07/30/netflix-users-profiles-start-appearing-on-apple-tv/.

* cited by examiner

*Primary Examiner* — Justin Shepard
(74) *Attorney, Agent, or Firm* — Brett J. Slaney; Blake, Cassels & Graydon LLP (57) ABSTRACT

A system and method are provided for enabling members of a television viewing location to generate user profiles on behalf of a video middleware system. The method comprises intercepting data exchanged between an end user apparatus and the video middleware system; processing the data to generate either first processed data in a first format familiar to a user lifecycle management system, or second processed data in a second format familiar to the video middleware system; and providing either the first processed data to the user lifecycle management system, or the second processed data to the video middleware system.

20 Claims, 5 Drawing Sheets

SYSTEM AND METHOD FOR CREATING AND MANAGING INDIVIDUAL USERS FOR PERSONALIZED TELEVISION ON BEHALF OF PRE-EXISTING VIDEO DELIVERY PLATFORMS

TECHNICAL FIELD

The following relates to systems and methods for creating and managing individual users for personalized television on behalf of pre-existing video delivery platforms.

DESCRIPTION OF THE RELATED ART

There exist several systems that provide for the personalization of users in a television (TV) viewing household. For example, one prior system uses an electronic tablet application to allow the primary account owner of a TV subscription to create multiple additional user profiles in the household for the purpose of allowing for the generation and provision of personalized TV experiences. Another prior system presents users with a "who's watching?" prompt, thereby encouraging a user to specifically identify themselves and others in the household by creating profiles which were then used to generate user level recommendations.

Collectively, these prior user management systems are typically an embedded component of the video middleware systems that distributors of TV services use to provide the core application logic and data for the TV viewing experience to entitled subscribers. These systems, commonly referred to as "video middleware systems", are known to be complex and expensive to implement, maintain and modify in TV service distributor environments. Within these video middleware systems, embedded individual user management systems that provide TV personalization at an individual level are a recent development.

The majority of prior video middleware systems have based TV application functions on an embedded household subscriber entity, as opposed to an individual user entity. In turn, most of the functions enabled by the majority of video middleware systems are performed on the basis of a subscribed household. These functions include, but are not limited to, the recording of videos on digital video recorders, the setting of channel lineups and restrictions, the creation of a single household profile for access to multiscreen television, and the association of various services such as non-video entertainment applications to a household subscription.

Prior video middleware systems that deliver TV services on the basis of a household, or that deliver TV services on the basis of individual users within a household, are known to be complex and expensive to implement. Often distributors of TV services have a limited and expensive set of options for introducing user-level personalization, since replacing a video middleware system delivers a TV service based on a household subscription with a video middleware system that can additionally manage individuals within a household, is often considered an economically unviable solution.

In response to the cost and complexity of a wholesale change of video middleware systems, some prior systems have implemented an adjacent solution that allows a set of non-TV services external to the household-based video middleware system to be accessed by members of the TV viewing household. Examples of these services external to the video middleware systems may include, but are not limited to, social media services, over-the-top media services, fitness services and games.

SUMMARY

In one aspect, there is provided a method of enabling members of a television viewing location to generate user profiles on behalf of a video middleware system, the method comprising: intercepting data exchanged between an end user apparatus and the video middleware system; processing the data to generate either first processed data in a first format familiar to a user lifecycle management system, or second processed data in a second format familiar to the video middleware system; and providing either the first processed data to the user lifecycle management system, or the second processed data to the video middleware system.

There is also provided a non-transitory computer readable medium comprising computer executable instructions for enabling members of a television viewing location to generate user profiles on behalf of a video middleware system, comprising instructions for: intercepting data exchanged between an end user apparatus and the video middleware system; processing the data to generate either first processed data in a first format familiar to a user lifecycle management system, or second processed data in a second format familiar to the video middleware system; and providing either the first processed data to the user lifecycle management system, or the second processed data to the video middleware system.

There is also provided a system for enabling members of a television viewing location to generate user profiles on behalf of a video middleware system, the system comprising a processor, at least one communication interface, and memory, the memory comprising computer executable instructions for: intercepting data exchanged between an end user apparatus and the video middleware system; processing the data to generate either first processed data in a first format familiar to a user lifecycle management system, or second processed data in a second format familiar to the video middleware system; and providing either the first processed data to the user lifecycle management system, or the second processed data to the video middleware system.

BRIEF DESCRIPTION OF THE DRAWINGS

Embodiments will now be described by way of example with reference to the appended drawings wherein.

DETAILED DESCRIPTION

It will be appreciated that for simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

In the following examples, it can be appreciated that the term "household" may refer to any location or premises (e.g., school, business, etc.) which is considered a TV viewing "group" and should not be limited to residential TV subscriptions.

It has been found that a one problem with the aforementioned adjacent solutions is that user level personalization is not feasible for the core TV services controlled by the household-based video middleware systems. Another problem found with these adjacent solutions is that each external non-TV service relies on its own internal user management component, resulting in a disparate user entity existing across each external service, regardless of whether a single individual is accessing these multiple services. Yet another problem found with these adjacent solutions is a divergence of consistency in the TV experience. In these situations, while some personal, non-TV services may be delivered on the basis of an individual user, the core TV experience is still delivered on the basis of a "household" or other group associated with the subscription.

The increasing importance of personalization in TV and media services has created a gap for those distributors of TV services that have implemented video middleware systems that manage the TV viewing experience on the basis of a household and that find they cannot justify a wholesale replacement of their video middleware system. Prior household-based video middleware systems have been found to lack the end-to-end processes to create and manage users. Prior household-based video middleware systems also have been found to lack the ability to permit these users, in the context of a household hierarchy, to enjoy a personalized viewing experience for TV viewing services and external services alike.

Accordingly, these is a need for a user lifecycle management system that can overlay an existing household-based video middleware system with a set of processes and application logic for the creation and management of users within the context of the household-based video middleware system. Such a user lifecycle management system advantageously provides a plurality of methods for user enrolment and dynamically initiates user enrolment flows based on actions undertaken upon the video middleware system. The flexibility and intelligence in such a system should also be more easily implemented in existing video middleware systems, and be efficient for implementation by the TV distributors.

There is also a need for a user lifecycle management system to be integrated with an existing household-based video middleware system without modifying the existing program code or design of the existing household-based video middleware system.

Additionally, there is a need for a user lifecycle management system to automatically intercept requests to the video middleware system that relate to the creation and management of users, and the personalization of services. These intercepted requests would then be sent to the user lifecycle management system with the context of the household viewing group intact. In this manner, users may be created within the context of a subscribed household, without requiring an overhaul of the existing video middleware system.

There is also a need for a user lifecycle management system that can return requests intercepted from the video middleware system, back to the video middleware system, without compromising the data or system integrity of the existing video middleware system.

There is also a need for an external user lifecycle management system to request resources on behalf of an individual from the household-based video middleware system. While the household-based video middleware system may not be capable of supporting the context of an individual, the user lifecycle management system should be able to use a user's profile to request personalized assets from the household-based video middleware system. For example, a user stored by the external system may have a set of favorite video assets that can be requested from the household-based video middleware system. In this example, the household-based video middleware system is returning video assets to the user lifecycle management system without any user level data needing to be persisted in the video middleware system.

There is also a need for an external user lifecycle management system to exchange user-level data with systems other than the household-based video middleware system. It has been found to be uncommon for user and subscriber data to reside only in the household based video middleware system in TV distributor infrastructure systems.

There is also a need for an external user lifecycle management system to use the created user identity for association with external services that may be personal in nature, including but not limited to, social media services, over-the-top media services, fitness services, games and as an access credential to personalized multiscreen TV services. In doing so, such a user lifecycle management system can overcome the shortcoming of disparate user identities in core TV and non-video external services.

It is accordingly an object of the following to provide a system that allows TV operators, having an existing household-based video middleware system installed, to authorize users in a TV viewing household for enrolling one or more user profiles into a user lifecycle management system, and that processes, stores, manages and presents such profiles to users for the purpose of providing a personalized TV service.

It is another object of the following to integrate and extend the capabilities of existing household-based video middleware systems without modifying the program code of the existing household-based video management system.

It is yet another object of the following to proxy an existing household-based video middleware system and automatically intercept requests intended for that system which relate to the creation and management of individual users, and the personalization of services. These intercepted requested may then be sent to the following user lifecycle management system with the context of the household viewing group intact. In this manner, users may be created within the context of a subscribed household.

It is yet another object of the following to generate and apply an overlay of the existing household based video delivery system without compromising the data or system integrity of the existing video middleware system.

It is yet another object of the following to request resources from the household based video middleware system on behalf of an individual managed in the user lifecycle management system. It has been recognized that, even though the household based video middleware system may not support the notion or context of an individual user, the system described herein can be configured to submit a request to the video middleware system that is enhanced with an individual user's profile data. For example, a user stored by the system may have a set of favorite video assets that can be requested by the household based video middleware system. In this example, the household-based video middleware system will return video assets to the user lifecycle management system without any user level data stored or persisted in the video middleware system.

It is yet another object of the following to exchange user level data with systems other than the household-based video middleware system. These systems may include, but are not limited to, business support systems, operational support systems, network application systems, identity management systems, recommendation engines and customer care and billing systems.

It is yet another object of the following to use the created user profiles in the user lifecycle management system for association with external services that may be personal in nature, including but not limited to, social media services, over-the-top media services, fitness services and games. Similarly, the system described herein can be configured to use the created user profile as a personalized access credential to multiscreen TV services. In doing so, the user lifecycle management system can overcome the shortcoming of disparate user identities in core TV and non-video external services.

The objects above may be addressed by the user lifecycle management system described herein. Such a system can include a software application processing engine that enables a plurality of enrolling, presenting and managing individual users in a household television viewing group, where the television service is delivered by a pre-existing video middleware system which is capable of only managing and delivering the viewing experience at a household level. A software application proxies the pre-existing video middleware system by intercepting a household-based request for video services. Based on the context of this request, the software application can invoke a user lifecycle management module to allow the enrolment, management and retrieval of users resident in the software application. The software application in such an embodiment dynamically reacts to the device and session information sent from a TV input apparatus to enable user lifecycle management and personalization processes for the user apparatus. The software application can also be configured to manipulate requests intended for the video middleware system by adding user-level metadata and resubmit those requests to retrieve and present personalized information to an individual user.

The system described herein may also be configured to enable the members of a TV-viewing household to create a hierarchy of users, whereby each user may use a specifically created user profile to personalize their TV experience. Particularly, a method of implementing a manner of creating, presenting and managing a household hierarchy of TV-viewing users as an overlay to pre-existing video middleware systems that deliver television and related services to subscribers on the basis of a household, or group subscriptions is provided. The system described herein can also address the insertion of processes related to the management of a user entity lifecycle without requiring the modification of surrounding TV and cable/telecommunications delivery systems. The system described herein can also enable an increased the efficiency in implementing a user lifecycle management capability for TV operators allowing for the creation, navigation and management of user profiles using a plurality of methods.

The user lifecycle management system may therefore include a software application processing engine that enables a plurality of methods for enrolling, presenting and managing individual users in a household television viewing group, where each user may consume services from the same household subscription of services. Each user may select a subset of the subscribed household services for consumption and define service preferences at an individual user profile level.

The user lifecycle management system can also be configured to extend the functionality of existing installed video middleware systems that have implemented a data and application model that manages the viewing relationship only at a household subscription level, as opposed to managing the viewing relationship at individual user levels within a household subscription.

Such a software application may include a processing engine that proxies the existing video middleware system and intercepts requests on its behalf. In at least one example, the system modifies the requests to incrementally adds user-level personalization to a viewer's experience, and subsequently re-transmits a manipulated version of the original request intended for the video middleware systems to enable user level personalization. The software application may also incorporate application modules to insert the management of the full user lifecycle, from user enrollment to user deletion to a video middleware system without requiring any modifications to the pre-existing video middleware system.

The software platform can also be configured to correlate individual user entities created by the aforementioned processing engine to household entities managed by existing video middleware systems and ancillary subscriber management systems. The software application processing engine can further store user-level metadata for each correlated user while additionally governing the privacy and security for each user profile in the household. The software platform may also implement a hierarchical representation and hierarchy-based policies for user in the household in order to perform user lifecycle actions for each user based on the user's role in the household, and may generate a visual representation of the hierarchy dynamically for the specific user profile who wishes to view the hierarchy.

The software platform can also be configured to provide a method for overlaying user-level application logic to existing household-based video middleware systems in a manner that is transparent to end users. All metadata and application functions performed by the existing video middleware systems can be automatically invoked by the system's application processing engine, meaning that no manual intervention is required to explicitly invoke the software application.

Figure 1:
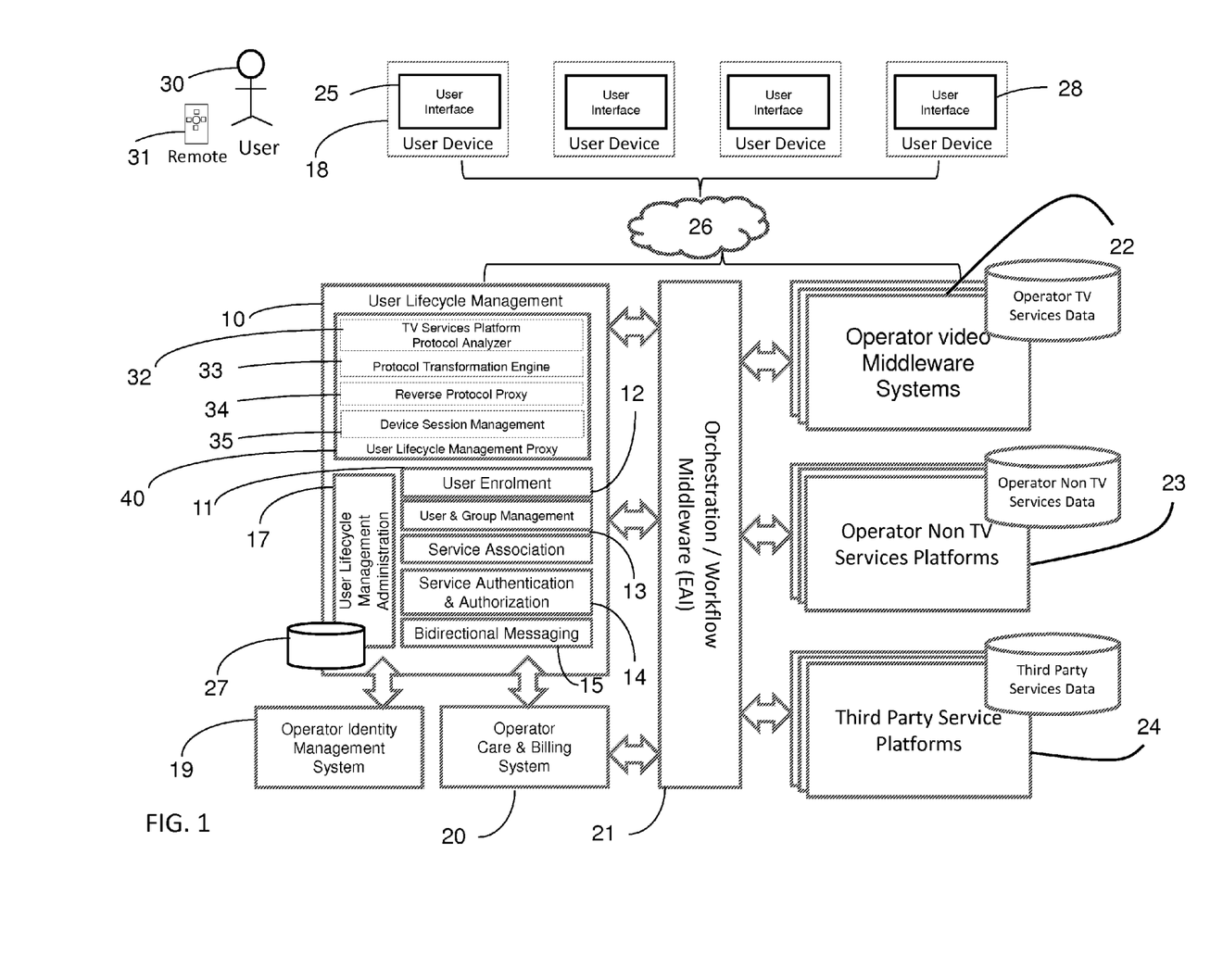
FIG. 1. is a block diagram showing various components of a system for creating and managing individual users for personalized television on behalf of pre-existing video delivery platforms.

The software platform can also provide an identity federation capability and processing engine for binding a plurality of services and features to any created user profile System Configuration Turning now to the figures, FIG. 1 is a block diagram illustrating various components of a user lifecycle management system, generally designated using numeral 10 hereinafter, as installed in a TV distributor's network and systems environment. Physically, the system 10 can be located in the TV distributor's data center, or another centrally located computing systems facility that can be remotely and securely accessed by the TV distributor. In this example, a number of user devices 18 are communicable with the system 10 via one or more networks 26. The user devices 18 include user interface components 25 that enable user-to-system interactions, which may be located physically on the user's device 18 or delivered via a remote system, namely the user lifecycle system 10 and the operator video middleware systems 22 in the example configuration shown in FIG. 1.

The user 30, using a remote apparatus 31, or directly interfacing with user interface 25 on user device 18, can execute television function instructions which in turn trigger actions on operator video middleware (orchestration/workflow) systems 22. These systems 22, which in this example do not support the provision of services at an individual user level (as opposed to a "household" level), receive instructions and return data for presenting user interfaces based on a subscribed account, or aggregate viewing household. For example, the operator video middleware systems 22, when requested by user 30 to present video on demand titles, may return recommended viewing titles that are generated based on viewing history in the aggregate by various members of the viewing household. These recommendations may be generated by the operator video middleware systems 22 transmitting viewing data to a third party service platform 24, in this case an external metadata analytics system and receiving back a set of suitable viewing titles to the user interface 25.

The user lifecycle management system 10 may be invoked by the user interface 25 and user device 18 in processes for which the TV Distributor wishes to inject personalization. When a user 25 interacts with a user device 18 to initiate a function for which the TV Distributor wishes to inject user-level personalization, a user lifecycle management proxy 40 intercepts the request intended for the operator video middleware systems 22 and invokes a TV services protocol analyzer 32 to analyze any proprietary format of the delivery of the request intended for the operator video middleware systems 22. A protocol transformation engine 33 converts the original request intended for the operator video middleware systems 22 into a format that is usable by the user lifecycle management 10 sub-systems. Following the conversion of the transmitted request, a device session management sub system 35 determines, based on the intercepted request, as much contextual information as possible which is related to de-constructing the household viewing group, in order to initiate the appropriate user lifecycle management subsystem.

Based on the information retrieved by the user lifecycle management proxy 40 from the user device 18 and the user interface 25, the user lifecycle management system 10 may request additional data using the contextual information received, from various other TV distributor systems including operator identity management systems 19, operator care and billing systems 20, operator video middleware systems 22, operator non TV services platform 23 and third party service platforms 24. This requested data may then be used by the user lifecycle management system 10 to initiate a corresponding user lifecycle management sub system.

Following the invocation of the appropriate user lifecycle management sub-system, the reverse protocol proxy 34 transmits data to an appropriate external system using the native protocol of the operator video middleware systems 22. In this manner the injection of the user lifecycle management sub-system data is transmitted as though it originated from, or was originally destined to, the operator video middleware systems 22 themselves.

Based on the context of the data received using the user lifecycle management proxy 40, the appropriate sub system may be invoked. These sub systems may include user enrolment 12, user and group management 13, service association 14, service authentication and authorization 15, bidirectional messaging 16 and user lifecycle management 17. Users managed by user lifecycle management 10 and related metadata are stored in user lifecycle management data store 27 in this example.

The user lifecycle management system 10 shown in FIG. 1 is only one advantageous configuration and it will be appreciated that other configurations are possible, e.g., to adapt to different TV distributor environments.

In operation, the User Lifecycle Management system 10 and user lifecycle management proxy 40 may function as follows:

Primary User Enrolment Mode

Figure 2:
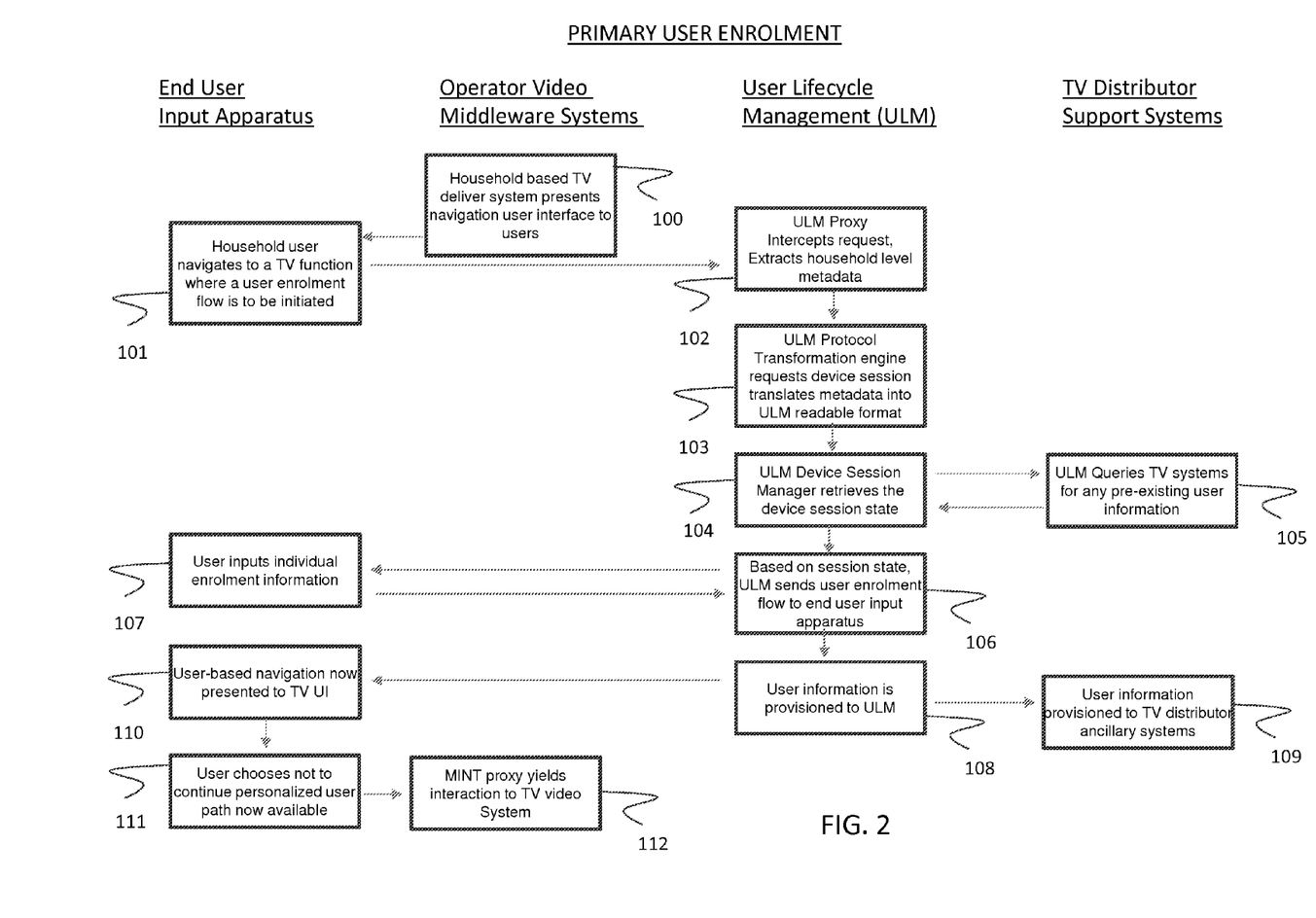
FIG. 2 is a flow diagram depicting user enrolment sub-processes to enable individual user enrolment for household-based video middleware systems.

When a TV Distributor wishes to insert a process that prompts a user 25 to create individual users for the consumption and provision of individualized TV services for a household (where individual user entities do not yet exist), the system 40 can be invoked to intercept a request from the user interface 25 or user device 18 that was originally destined to the operator video middleware systems 22 as illustrated in FIG. 2.

In the example shown in FIG. 2, a user 30 having an account or subscription with a household-based operator middleware system 22 is presented with a TV navigation interface 25 by the operator video middleware systems 22 at 100. It can be appreciated that a user 30 navigates within this interface in an anonymous manner, known only at the household level. In step 101 the user 30 navigates to a TV function where a user enrolment flow is presented, which is functionality that the TV distributor wishes to provide, using the system 10. At a point where it is detected that the primary user enrolment process is to be initiated, the user lifecycle management proxy 40 intercepts a detected request from the user interface 25 in step 102 and extracts metadata where available from the request. The user lifecycle management protocol analyzer 32 and transformation engine 33, then parse and translate the request into a format understood by the user lifecycle management system 10 in step 103.

In step 104, the user lifecycle management device session manager 35 uses the metadata from step 103 to determine the device and session state of the end user interaction. This data is passed to the TV distributor support systems 19 and 20 and 24 to determine if any pre-existing users exist for this TV viewing household in step 105.

In step 106, having determined that there are no pre-existing users for this TV viewing household, the user lifecycle management system 10 initiates the user enrolment sub system 12 to provide a primary user enrolment process flow and input interface the end user interfaces 25 and 28. In step 107, the user inputs individual profile information and returns this metadata to be stored in user lifecycle management database 27. Following the successful creation of a user profile, the user information is confirmed in user lifecycle management data store 27 in step 108. In step 109, user lifecycle management system 10 may provision this user information to ancillary operator systems including operator identity management systems 19, operator care and billing systems 20 and operator non TV services platforms 23 as needed.

Once a primary user is created in the user lifecycle management system 10, the user 30 may authenticate and experience a personalized video experience, further detailed in connection with FIGS. 2 and 3. In step 111, the user chooses not to navigate the video experience as an authenticated user. In step 112, the user continues navigation functions provided by the operator video middleware systems 22 and returns interactions directly between user interface 25 and operator video middleware systems 22. With the primary user now created, the TV viewer may now experience a video experience in their normal anonymous manner, and additionally as an authenticated user in order to enjoy a personalized experience.

User Authentication Flow

Figure 3:
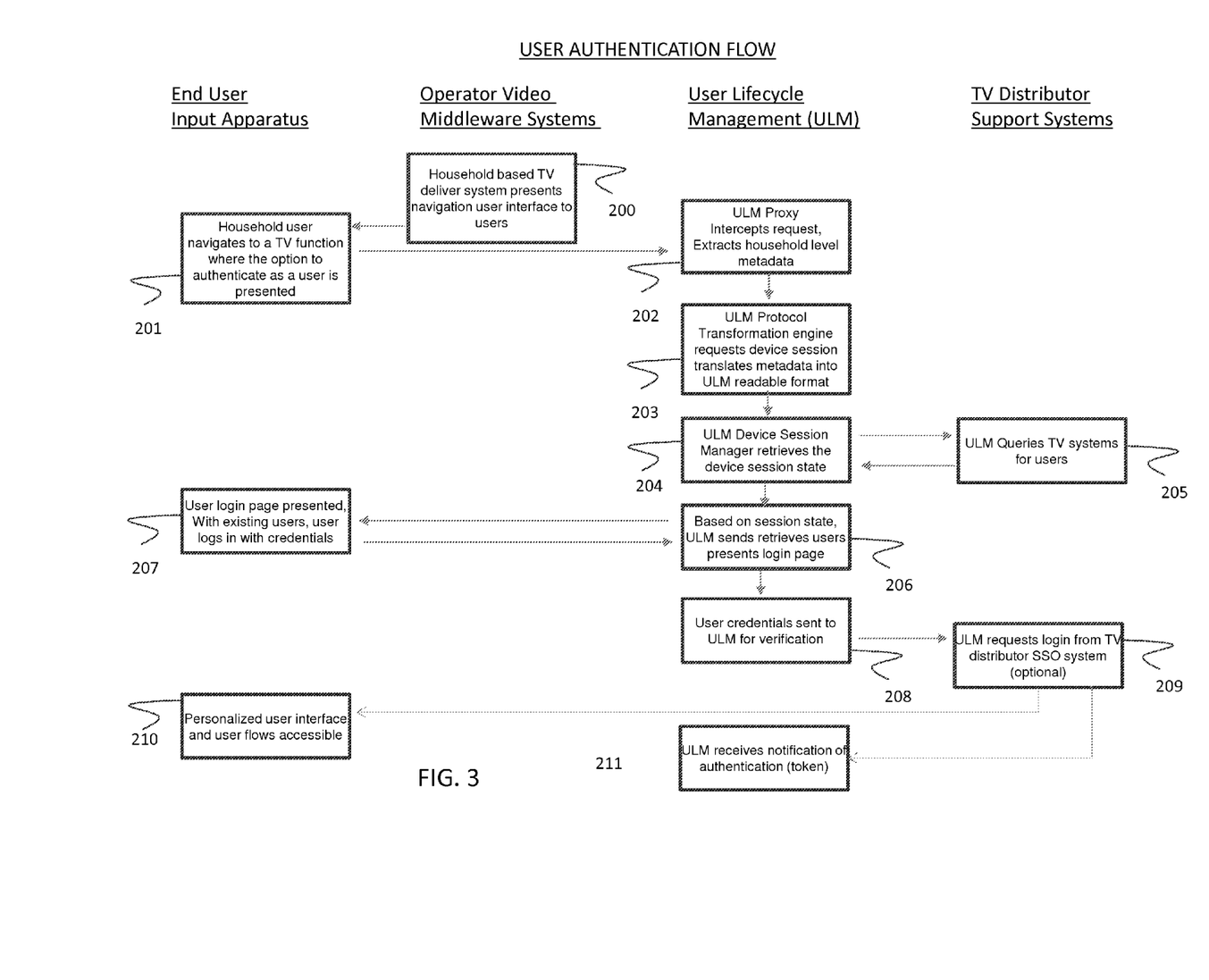
FIG. 3 is a flow diagram depicting user enrolment sub-processes to enable individual user authentication for the purposes of personalized television services.

Following the creation of users in system 10, a user 30 may navigate household-based operator video middleware systems 22 and be authenticated as an individual user as illustrated in FIG. 3.

In step 200, a user may navigate the user interface 25 as presented by the operator video middleware systems 22 without identifying themselves as a user or authenticating to a user profile. In step 201 the user navigates the TV interface to a point where the option to select a user and be authenticated is provided. This option is provided by the user lifecycle management system 10, specifically injected into the navigation experience via user lifecycle management proxy 40. Once the user arrives at this interface and makes a navigation request, the user lifecycle management proxy 40 intercepts the navigation request to initiate the authentication process flow. In step 202, the user lifecycle management proxy 40 retrieves the request which may include additional contextual information, including the household account and device identifier. In step 203, the user lifecycle management protocol transformation engine 33 parses and transforms the request, originally intended for the operator video middleware systems 22, into a format readable by the user lifecycle management system 10. In step 204, once the user lifecycle management system 10 can appropriately read and determine the metadata, the metadata is used to determine which process flow to initiate. Optionally, step 205 may be invoked, which involves the user lifecycle management system 10 using the metadata retrieved in steps 202-204 to query an external operator system (e.g., an identity management system) to determine if any pre-existing users are stored for the account or device represented by the contextual data. This optional step may occur in operator environments where user entities are stored and mastered in systems outside of user lifecycle management 10. In other cases, the user lifecycle management system may only need to query its embedded sub-system database 27.

In this example, when users do exist, the user lifecycle management service authentication and authorization sub-system 15 retrieves the existing user profiles and presents and transmits user data and an authentication interface to user 30 and user interface 25 in step 207. Also in step 207, the user 30 selects a user profile and provides optional user credentials for authenticating themselves to that user profile. This data is transmitted securely to the user lifecycle management service authentication and authorization sub system 15 in step 208. The data may either be verified internally by the user lifecycle management credentials stored in user lifecycle management sub system 10 or optionally, the credentials may be verified via transmission to an external operator non TV services platform 23, operator video middleware systems 22, operator identity management systems 19 or operator care and billing systems 20 as presented in step 209. In the event that authentication is provided by an external system, the user lifecycle management authentication and authorization subsystem 15 may be notified of a successful authentication with the receipt of a session-based token in step 211.

Following successful authentication, the user has initiated a session with user lifecycle management system 10 and may initiate individual user level personalized processes in step 210. For example, based on the individual user profile, a distinct set of recommendations can be provided for a personalized TV experience, as described by way of example below.

Browse Personalized Videos Flow

Figure 4:
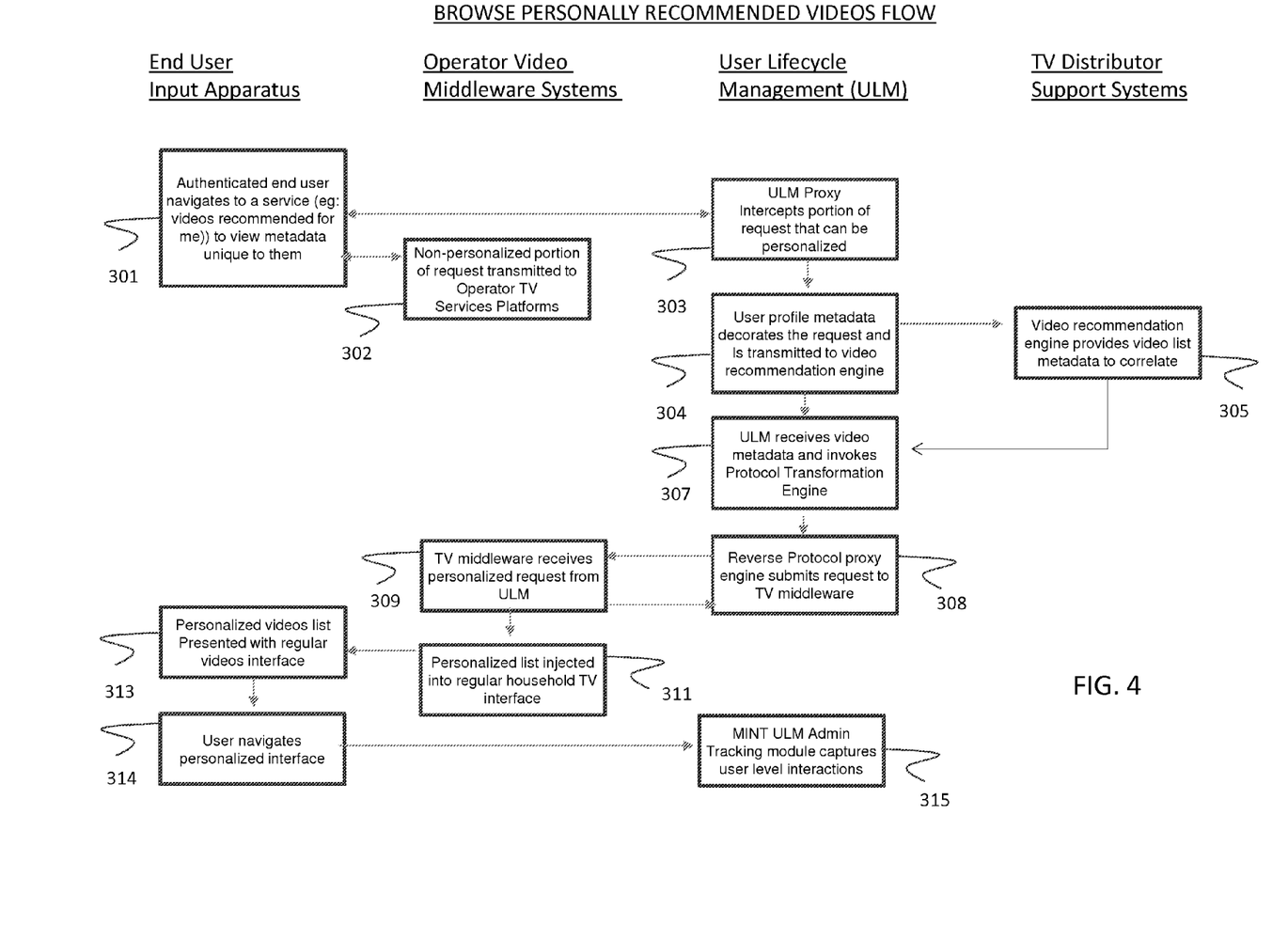
FIG. 4 is a block diagram showing various components of the system shown in FIG. 1 interacting for the purposes of personalizing video on demand services.

Once a user 25 has been authenticated by the user lifecycle management system 10, the user may initiate processes provided by the user lifecycle management system 10 to extend the functionality of the operator TV services platform 22 by delivering an individual user-level experience without any modification to the household-based operator video middleware systems 22 as illustrated in FIG. 4. In this example, the user lifecycle management system 10 virtually extends the functional interaction between an operator video middleware system 22 and a video on demand recommendations engine (e.g., a non-TV services platform 23) by transmitting data and executing processes between the two systems to derive user level, personal video on demand recommendations based on individual viewing habits (as opposed to household video on demand recommendations based on the aggregate viewing habits of the members of a household).

Step 301 presumes a user 30 has already authenticated with the user lifecycle management system 10 as previously illustrated. Following that, the user navigates to a TV function where the TV distributor now wishes to insert a personalized experience. The user interface 25 issues two simultaneous requests in this example. The first request is generated in step 302 in which the user interface queries user interface functions and elements from the existing operator video middleware systems 22 that are not subject to individual user level personalization, for example, general menus, generally available videos, etc. The second request is generated in step 303 in which a request to retrieve contextual metadata for an authenticated user's 25 prior viewing habits as stored in the user lifecycle management system 10, is passed to the user lifecycle management proxy 40. As previously illustrated, the user lifecycle management proxy 40 may also require the translation of this request into a format readable by user lifecycle management system 10.

In step 304, contextual metadata representing the user's prior viewing habits is retrieved from user lifecycle management data store 27 and in step 305, the data is transmitted to the TV distributor's video recommendations engine 23 which then returns metadata representing an appropriate set of recommended videos for viewing for that user. The metadata retrieved by the recommendations engine is transmitted to the user lifecycle management proxy 40, where the user lifecycle management protocol transformation engine 33 parses and converts the metadata into a format readable by the operator video middleware system 22, if required, in step 307. In step 308, the user lifecycle management reverse protocol proxy 34 re-translates the originating message from step 301 into a format readable by the operator video middleware systems 22. In this manner the operator video middleware systems 22 receives the request as if it had come directly from the user 25 with no intervention from the user lifecycle management system 10.

In step 309, the operator video middleware system 22 receives a modified request to provide metadata for recommended videos. These videos are now retrieved according to the individual user's preferences and context. In step 311 a personalized list is injected into the remainder of the interface as presented in step 302. In step 313 the user 25 may now navigate a list of on demand videos that now includes a specific subset of metadata that represents videos targeted to that User based on their context as managed by user lifecycle management 10.

In steps 314 and 315, this example illustrates how a profile is continually incremented based on the authenticated viewer's continued navigation of the TV services interface by having a tracking module capture user level interactions at 315, by observing navigations in step 314.

Associated Personalized Services Flow

Figure 5:
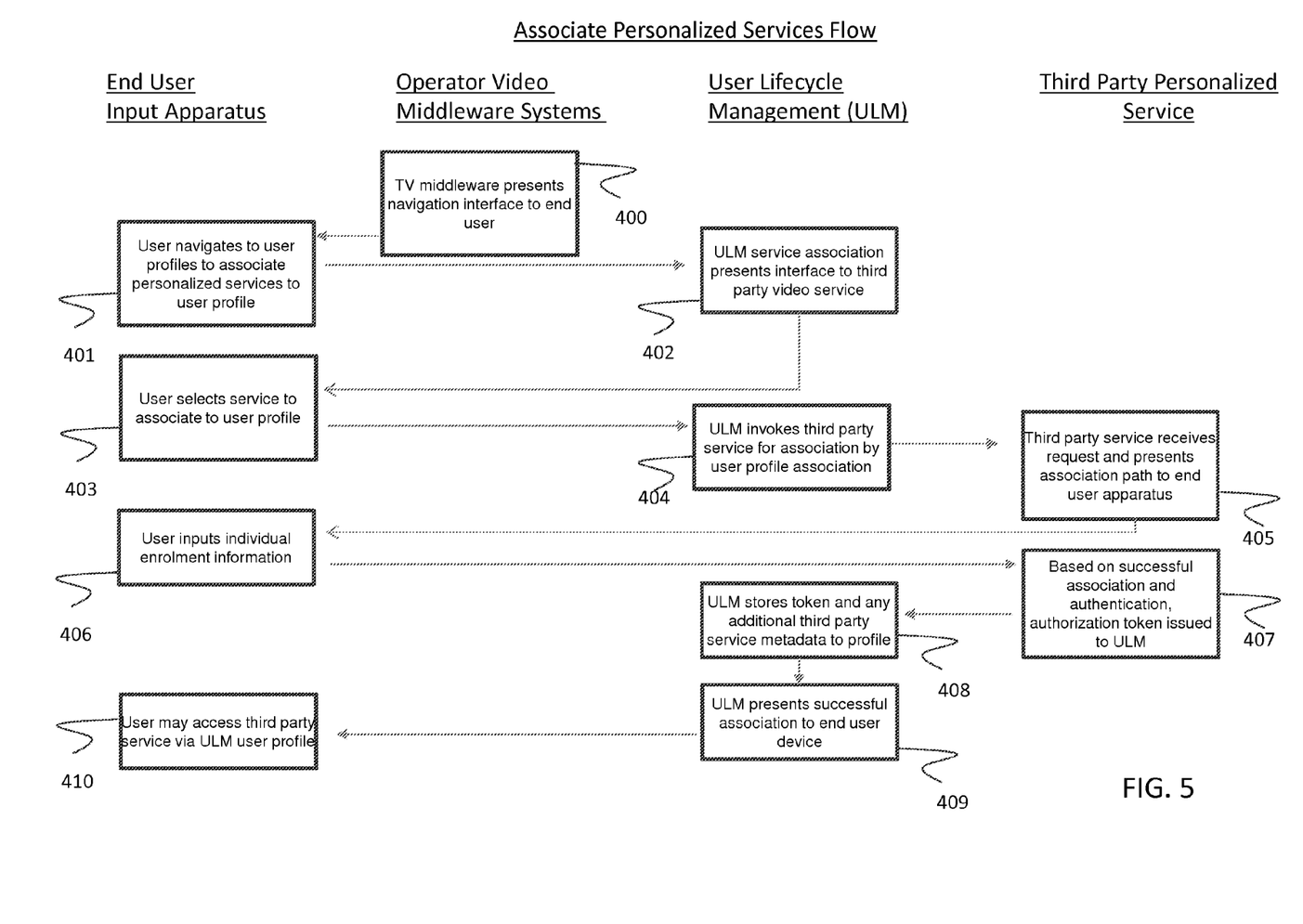
FIG. 5 is a block diagram showing various components of the system shown in FIG. 1 interacting for the purposes of federating non TV services to users stored by a user lifecycle management system.

As illustrated in FIG. 5, the ability to extend household based operator video middleware systems 22 creates a secondary opportunity to federate and bind additional personal services from third party service platforms to these newly created users. For example, the TV distributor may wish to integrate a third party streaming music service which is hosted on a remote third party service platforms 24 and which is available via an end-user authentication.

In step 400, the pre-existing operator video middleware systems 22 presents a navigation interface 25 to a user who has created a user profile and is authenticated. This user 30 uses a device 18 to navigate to a new interface menu option that allows the association of the pre-created user profile one or more third party services in step 401. When the user selects this menu option, the request is sent to the user lifecycle management service association sub system 14 which retrieves the list of available third party services 24 available for association to that user entity. In step 402, the user lifecycle management service association sub system 24 returns to the user interface 25 the list of available services for association. In step 403, the user selects the third party service 24 for association to their user profile. Once the selection is transmitted to the user lifecycle management system 10, the user lifecycle management service authentication and authorization sub system 14 transmits a request to the third party service 24 which includes metadata for that user to associated, authorized and authenticated to that service. In step 405, the request is received by the third party service 24, and will determine whether or not additional authentication or authorization information is required by the user 25. In step 406, the third party service 24 issues a request or instruction to user interface 25 and user 30 to complete the steps required to associate the third party service with the user's profile. This request or instruction typically provides a final authentication or association step for that user, in a manner that is transparent to the user lifecycle management system proxy 40, for credential security purposes.

In step 407, based on the successful authentication and authorization to the service by the end user 25, the third party service 24 may issue a token to user lifecycle management authorization and authentication sub system 14 to allow for seamless authentication in subsequent interactions. In step 408, the third party service is now federated to the user, any additional third party service metadata (e.g., service preferences) may be stored in the user lifecycle management data store sub system to enhance the TV Distributor's user profile.

In step 409, following the successful association of the third party service 24 to the user lifecycle system 10 user entity, the user 25 is authenticated to the third party service via the user profile. In step 410 the user 25 may use the third party service 24 in a personalized manner via the user lifecycle management system 10. The use of the third party service is invoked via the user lifecycle management proxy 40 and its associated components, in turn leveraging service authentication and authorization 14, to access the third party service in a manner transparent to operator video middleware systems 22.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the system 10, system proxy 40, middleware systems 22 any component of or related thereto, etc., or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A method of overlaying user personalization onto a pre-existing video middleware system, the method comprising:

intercepting, at an intermediary device, data exchanged between a pre-existing end user apparatus and the pre-existing video middleware system using a communication protocol therebetween, without requiring modifications to the pre-existing end user apparatus, the pre-existing video middleware system, or the protocol;

processing the intercepted data at the intermediary device, to generate first processed data in a first format familiar to a user lifecycle management system to have the user lifecycle management system provide personalization for one or more user profiles managed by the user lifecycle management system, on behalf of the video middleware system;

preparing second processed data in a second format compatible with the communication protocol so as to be familiar to both the pre-existing video middleware system and the pre-existing end user apparatus as if the second processed data was sent directly via the communication protocol, the second processed data including either data for providing personalization at the end user apparatus or for obtaining video data from the video middleware system to be personalized;

providing the first processed data to the user lifecycle management system to enable personalization for the end user apparatus; and sending second processed data to the video middleware system to obtain the video data to be personalized, and to the end user apparatus to provide at least one personalization user interface via the end user apparatus.

2. The method of claim 1, wherein the intercepted data corresponds to a request from the end user apparatus for creating a profile, the method further comprising:

communicating with the user lifecycle management system to create the profile; and providing user interface data to the end user apparatus including an indication of the profile.

3. The method of claim 2, wherein the profile is incorporated into or creates a new hierarchy of profiles for a television viewing location.

4. The method of claim 1, wherein the intercepted data corresponds to a request for recommendations for an existing profile, the method further comprising:
communicating with the video middleware system using second processed data, to generate the recommendations to be provided to the end user apparatus as if the request was sent directly to the video middleware system.

5. The method of claim 1, wherein the intercepted data corresponds to a request for associating a third party service to a profile, the method further comprising:
communicating with the third party service to have the third party service provide an association path to the end user apparatus; and
providing access to the third party service to the end user apparatus after determining a successful association.

6. The method of claim 1, further comprising:
determining a context of a request received at the intermediary device, to dynamically determine a level of existing personalization for the request.

7. The method of claim 1, further comprising initiating a user creation or authentication flow to enable a user-level personalization process.

8. The method of claim 1 further comprising correlating individual user entities to existing household entities managed by at least one of the video middleware system and an ancillary television distribution system.

9. The method of claim 1, wherein the data is intercepted via an overlay on a user interface provided by the video middleware system to add functionality to the user device transparently to the video middleware system.

10. A non-transitory computer readable medium comprising computer executable instructions for overlaying user personalization onto a pre-existing video middleware system, comprising instructions for:
intercepting, at an intermediary device, data exchanged between a pre-existing end user apparatus and the pre-existing video middleware system using a communication protocol therebetween, without requiring modifications to the pre-existing end user apparatus, the pre-existing video middleware system, or the protocol;
processing the intercepted data at the intermediary device, to generate first processed data in a first format familiar to a user lifecycle management system to have the user lifecycle management system provide personalization for one or more user profiles managed by the user lifecycle management system, on behalf of the video middleware system;
preparing second processed data in a second format compatible with the communication protocol so as to be familiar to both the pre-existing video middleware system and the pre-existing end user apparatus as if the second processed data was sent directly via the communication protocol, the second processed data including either data for providing personalization at the end user apparatus or for obtaining video data from the video middleware system to be personalized;
providing the first processed data to the user lifecycle management system to enable personalization for the end user apparatus; and
sending second processed data to the video middleware system to obtain the video data to be personalized, and to the end user apparatus to provide at least one personalization user interface via the end user apparatus.

11. The non-transitory computer readable medium of claim 10, wherein the intercepted data corresponds to a request from the end user apparatus for creating a profile, further comprising instructions for:
communicating with the user lifecycle management system to create the profile; and
providing user interface data to the end user apparatus including an indication of the profile.

12. The non-transitory computer readable medium of claim 11, wherein the profile is incorporated into or creates a new hierarchy of profiles for a television viewing location.

13. The non-transitory computer readable medium of claim 10, wherein the intercepted data corresponds to a request for recommendations for an existing profile, further comprising instructions for:
communicating with the video middleware system to generate the recommendations to be provided to the end user apparatus as if the request was sent directly to the video middleware system.

14. The non-transitory computer readable medium of claim 10, wherein the intercepted data corresponds to a request for associating a third party service to a profile, further comprising instructions for:
communicating with the third party service to have the third party service provide an association path to the end user apparatus; and
providing access to the third party service to the end user apparatus after determining a successful association.

15. The non-transitory computer readable medium of claim 10, further comprising instructions for:
determining a context of a request received at the intermediary device, to dynamically determine a level of existing personalization for the request.

16. The non-transitory computer readable medium of claim 10, further comprising instructions for initiating a user creation or authentication flow to enable a user-level personalization process.

17. The non-transitory computer readable medium of claim 10, further comprising instructions for correlating individual user entities to existing household entities managed by at least one of the video middleware system and an ancillary television distribution system.

18. The non-transitory computer readable medium of claim 10, wherein the data is intercepted via an overlay on a user interface provided by the video middleware system to add functionality to the user device transparently to the video middleware system.

19. The non-transitory computer readable medium of claim 10, wherein the intercepted data corresponds to a request for recommendations for an existing profile, further comprising instructions for:
communicating with the video middleware system using second processed data, to generate the recommendations to be provided to the end user apparatus as if the request was sent directly to the video middleware system.

20. An intermediary device for overlaying user personalization on a pre-existing video middleware system, the system comprising a processor, at least one communication interface, and memory, the memory comprising computer executable instructions for:
intercepting, at the intermediary device, data exchanged between a pre-existing end user apparatus and the pre-existing video middleware system using a communication protocol therebetween, without requiring modifications to the pre-existing end user apparatus, the pre-existing video middleware system, or the protocol;

processing the intercepted data at the intermediary device, to generate first processed data in a first format familiar to a user lifecycle management system to have the user lifecycle management system provide personalization for one or more user profiles managed by the user lifecycle management system, on behalf of the video middleware system;

preparing second processed data in a second format compatible with the communication protocol so as to be familiar to both the pre-existing video middleware system and the pre-existing end user apparatus as if the second processed data was sent directly via the communication protocol, the second processed data including either data for providing personalization at the end user apparatus or for obtaining video data from the video middleware system to be personalized;

providing the first processed data to the user lifecycle management system to enable personalization for the end user apparatus; and sending second processed data to the video middleware system to obtain the video data to be personalized, and to the end user apparatus to provide at least one personalization user interface via the end user apparatus.

* * * * *